United States Patent Office 3,049,931
Patented Aug. 21, 1962

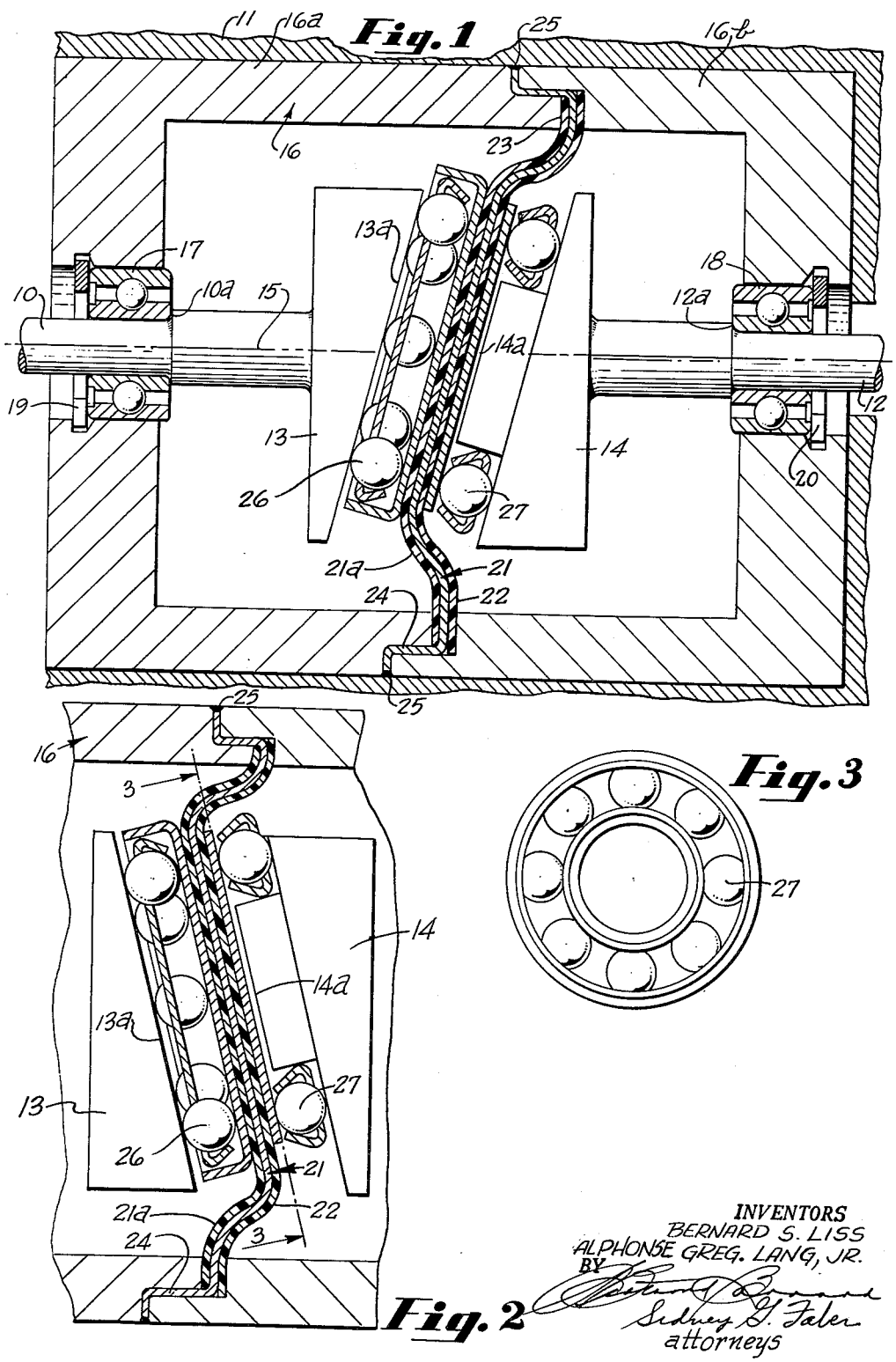

3,049,931
SEALED ROTATION TRANSMISSION COUPLING
Alphonse G. Lang, Jr., Asheville, N.C., and Bernard S. Liss, Glen Rock, N.J., assignors to General Precision, Inc., a corporation of Delaware
Filed Nov. 25, 1959, Ser. No. 855,391
2 Claims. (Cl. 74—17.8)

This invention generally relates to drive couplings for rotatively interconnecting a drive shaft and driven shaft, and is particularly concerned with the transmission of rotative movement through a completely fluid tight enclosure, isolating the drive and driven shaft, without disturbing the fluid tight seal therebetween.

It is well known in many different applications to completely enclose the instruments and other parts in a sealed housing that may be filled with a dry neutral gas to prevent such effects as corrosion, oxidation, rotting and others from taking place, and effecting the operation of the equipment. For rotatably setting and adjusting the enclosed parts as may be necessary from time to time, it is also known to employ hermetically sealed couplings having a part that is accessible and movable from outside the housing and capable of transmitting the movement inside thereof through the fluid tight seal to effect the necessary adjustments or control. One such known device is disclosed in Patent 2,454,340, and another is shown in Patent 2,419,074, both being assigned to the same assignee as the present invention, and being well known and manufactured under assignee's trademark "Hermeflex."

In the former device there is employed what might be generally termed an oscillating bellows and a wobble shaft, with the wobble shaft serving to interconnect the drive shaft located outside the sealed enclosure with a driven shaft located inside thereof to couple the two shafts together for joint rotation. In this device the oscillating bellows device provides a seal for maintaining a fluid tight isolation between the two shafts.

According to the present invention there is provided a new and unique coupling device for performing this same general function that eliminates the wobble shaft, and in a first embodiment thereof, also eliminates the bellows device. Instead, according to this first embodiment, there is provided a flexible diaphragm member to completely seal the housing in a fluid tight manner together with a pair of complementarily arranged substantially cylindrical wedge shaped members on opposite sides of the flexible diaphragm. The wedge shaped members are maintained in pressure engagement with one another through the medium of the diaphragm thereby to transmit rotary movement therebetween without rotating the diaphragm by utilizing a series of ball thrust members between each of the wedge-shaped members and the corresponding side of the diaphragm.

It is accordingly one object of the present invention to provide a fluid sealed coupling mechanism for transmitting rotary motion and having a longer useful life.

Another object is to provide such a coupling capable of transmitting relatively large torques.

Still another object is to provide a coupling for efficiently positioning a member within a completely sealed enclosure.

Still another object is to provide a mechanical coupling that may rotate a member within a completely sealed enclosure at relatively high speed.

Still a further object is to provide a hermetically sealed mechanical coupling for rapidly rotating a member within a sealed housing and for transmitting a relatively high torque thereto.

FIGURE 1 is a longitudinal cross-sectional view illustrating one preferred embodiment of the invention, showing one type of transmitting means.

FIGURE 2 is an enlarged portion of the device of FIGURE 1 showing the rotatable parts in a different rotative position.

FIGURE 3 is an oblique cross-sectional view taken along lines 3—3 of FIGURE 2.

Referring now to FIGURE 1 for a detailed consideration of one preferred rotary coupling according to the present invention, there is shown an external drive shaft 10 which may be rotated manually or by a motor (not shown) located outside the sealed enclosure 11, an internal driven shaft 12 being located inside the space to be sealed and adapted to be driven by rotation of the drive shaft 10, and a pair of generally identically inclined substantially cylindrical wedge shaped members 13 and 14 in a confronting complementary relationship, with wedge shaped member 13 being fastened or integral with drive shaft 10 for rotation therewith and with wedge shaped member 14 being similarly fastened or integral with driven shaft 12.

The drive shaft 10 and driven shaft 12 are each coaxially aligned about longitudinal axis 15, as shown, and are each rotatively supported in the opposing end walls of a case 16 by means of combined thrust and radial ball bearings 17 and 18, respectively.

The function provided by the combined thrust and radial ball bearings 17 and 18 is to prevent longitudinal or other movement of either shaft 10 or 12 along or transverse to longitudinal axis 15 but to enable both shafts to rotate about this axis with a minimum of friction. To prevent axial movement of the shafts, each of the shafts 10 and 12 may be formed with an enlarged shoulder portion 10a and 12a bearing axially outward against the inner races of bearings 17 and 18, thereby to form stops to limit axial movement. Bearings 17 and 18, in turn, are fitted in place within suitable cylindrical openings in the opposite end walls of case 16, and prevented from axial movement out of the case 16 by means such as snap rings 19 and 20. Consequently the only motion that is permitted the shafts 10 and 12 is rotation about longitudinal axis 15.

According to this preferred embodiment, the cylindrical wedge shaped members 13 and 14 are urged toward one another by the radial thrust bearings 17 and 18, and in the absence of structure between the confronting faces of the two wedges, their inclined faces would mate into contact. Rotation of the drive shaft 10 and drive wedge member 13 would thus be terminated to the follower wedge member 14 and to driven shaft 12 to effect a rotative coupling between the two shafts.

However, according to the present invention, there is provided a means for hermetically sealing the area between the two cylindrical wedge members 13 and 14 in such manner that rotation of the drive wedge member 13 may continue to position the follower wedge member 14, as above described, but may do so while maintaining a non-rotatable seal member interposed between the two wedge members to divide the interior of the case 16 into left and right-hand chambers hermetically sealed from one another.

For hermetically sealing the right-hand portion of the housing 11 and the case 16 containing the driven shaft 12, from the left-hand portion containing the drive shaft 10, there is provided a flexible diaphragm member 21 interposed between the sloping face portions of the wedge members 13 and 14 and having its edges or rim portions 22 embedded in and sealed within an annular groove 23 formed completely about the interior of the supporting case 16.

As shown, the diaphragm 21 may be a multilayer sheet as shown in FIGURE 2 formed of an inner thin flexible sheet of metal foil or the like for strength that is sandwiched between outer layers of a suitable plastic material 21b such as Teflon or polyethylene. This multilayer sheet is necessarily provided with a much larger surface area than the cross-sectional area of the supporting case 16 to facilitate the necessary flexing movement thereof, as will be described more fully hereafter. To insure a fluid tight seal between the diaphragm 21 and the case 16, the case 16 may be formed of two interlocking sections 16a and 16b, as shown, which are adapted to mate and form a substantially Z-shaped spacing therebetween to accommodate the rim or edge portions 22 of the diaphragm. The terminal edge of the inner metal layer 24 of the diaphragm may, in addition, be soldered to both sections at bead 25 to insure a fluid tight joint.

Thus there is provided within the supporting case 16, a fluid tight thin flexible diaphragm member 21 that is completely sealed about the inside wall of the case to provide a fluid tight chamber enclosing the follower wedge member 14, driven shaft 12 and other members connected thereto from the atmosphere and contaminants that may exist outside the housing 11 and in the volume around the drive shaft 10 and drive wedge 15.

Since the flexible diaphragm 21 is sealed about its edges 22 at the bead 25, to the case 16, it may not rotate about axis 15 but may only flex and oscillate in a direction generally lengthwise of longitudinal axis 15. Thus as the drive wedge member 13 is rotated about the longitudinal axis 15, its inclined face portion rotates adjacent the surface or face of the flexible diaphragm member 21. To minimize friction between these relatively sliding surfaces and to provide the operation desired, there is provided balls 26 positioned intermediate the face 13a of wedge 13 and a cup-shaped substantially circular spacer 60, interposed between the balls 26 and the facing surface of the diaphragm 21, and a somewhat similar set of balls 27 is provided intermediate the sloping surface 14a of follower wedge member 14 and a substantially circular disc 61 interposed between the balls 27 and the opposite face of the diaphragm 21. As thus far described, therefore, there is provided a pair of complementarily arranged and confronting substantially cylindrical wedge members 13 and 14 adapted to sandwich a flexible diaphragm 21, with each wedge member being provided with ball type thrust bearings intermediate its sloping face portion and the adjacent face of the diaphragm 21.

In operation, the hermetically sealed coupling functions in somewhat the same manner as if the diaphragm 21 and ball thrust bearings 26 and 27 were not present, and the sloping faces 13a and 14a of the wedges were in abutting relation. That is, rotation of the drive shaft 10 and wedge member 13 effects a similar rotation of the follower wedge member 14 and the driven shaft 12. The presence of the thin flexible diaphragm 21 intermediate the faces of the wedge members does not in any manner interfere with a drive coupling therebetween since the flexible diaphragm is sufficiently thin and flexible to enable thrust to be produced between the two members through the diaphragm 21 whereby the wedge members are maintained in confronting alignment and rotation of the drive wedge member transmits a turning torque through the diaphragm to rotate the follower wedge member 14. Since the face area of the diaphragm is made much larger than the cross section of the case 16, the portion of the diaphragm 21 located inside the case 16, may flex and oscillate with rotation of the wedge members thereby to follow the sloping position of the wedge faces 13a and 14a with turning.

This flexing action may be understood by comparing the position assumed by the diaphragm 21 in FIGURE 1 with that assumed in FIGURE 2. In FIGURE 1, the drive wedge member 13 is positioned with its inclined surface tilted to the right, and it is observed that the diaphragm 21 is likewise inclined to the right. Upon rotation of drive wedge member 13 to a position displaced 180° therefrom, its inclined surface is tilted to the left; and as is observed in FIGURE 2, the flexible diaphragm 21 is likewise flexed to tilt to the left.

What is claimed is:

1. Means for rotating a member enclosed within a hermetically sealed housing comprising a flexible sheet sealing an opening through the housing, a member having an inclined surface external to the sheet and having a plurality of balls over said inclined surface against a relatively flat member attached to the flexible sheet, a second member having a complementary inclined surface inside the housing and having a plurality of balls in engagement with its incline, the balls being located against a relatively flat member attached to the other side of the flexible sheet, said first member being rotatively supported on a first shaft extending outside the housing and said second member being rotatively supported on a second shaft extending outside the opposite end of the housing that is coaxial with the first shaft, and both members being retained in pressured engagement against said flexible sheet thereby to enable their inclined surfaces to mate in sandwiched relation through the flexible sheet and the relatively flat members attached thereto, whereby rotation of said first shaft drives the second shaft, at least one of said relatively flat members attached to said flexible sheet being provided with an annular rim to define a cup; said balls bearing against said flat member having said annular rim to define said cup being removably disposed within said cup, at least one of said members having an inclined surface being provided with a substantially cylindrical hub integral with the member and substantially perpendicular to the inclined surface thereof, the second relatively flat member having a substantially circular central opening therethrough, the central opening being adapted to fit the cylindrical hub, said cylindrical hub being adapted to centrally support the second relatively flat member, the flexible sheet being formed of a thin flexible sheet of metal foil, a major portion of the surfaces of said metal foil being coated with a pliable plastic material.

2. Means for rotating a member enclosed within a hermetically sealed housing comprising a flexible sheet sealing an opening through the housing, a member having an inclined surface external to the sheet and having a plurality of balls over said incline against a relatively flat member attached to the flexible sheet, a second member having a complementary inclined surface inside the housing and having a plurality of balls in engagement with its incline, the balls being located against a relatively flat member attached to the other side of the flexible sheet, said first member being rotatively supported on a first shaft extending outside the housing and said second member being rotatively supported on a second shaft extending outside the opposite end of the housing that is coaxial with the first shaft, and both members being retained in pressured engagement against said flexible sheet, thereby to enable their inclined surfaces to mate in sandwiched relation through the flexible sheet and the relatively flat members attached thereto, whereby rotation of said first shaft drives the second shaft, at least one of said relatively flat members attached to said flexible sheet being provided with an annular rim to define a cup; said balls bearing against said flat member having said annular rim to define said cup being removably disposed within said cup, at least one of said members having an inclined surface being provided with a substantially cylindrical hub integral with the member and substantially perpendicular to the inclined surface thereof, the second relatively flat member having a substantially circular central opening therethrough, the central opening being adapted to fit the cylindrical hub, said cylindrical hub being adapted to centrally support the second relatively flat member, the flexible sheet being formed of a thin flexible sheet of metal foil, a major portion of the surfaces of the sheet being coated with a pliable plastic material, the metal foil portion of the flexible sheet, projecting beyond the plastic coating, being clamped between adjacent ends of the sections of the housing, and heat sealed thereto to form a positive seal between the sections of the housing.

References Cited in the file of this patent

UNITED STATES PATENTS

| | | | |
|---|---|---|---|
| 765,462 | Dennison | July 19, | 1904 |
| 773,232 | Smith | Oct. 25, | 1904 |
| 1,791,080 | Yeager | Feb. 3, | 1931 |
| 2,119,955 | Litton | June 7, | 1938 |
| 2,404,801 | Hallerith | July 30, | 1946 |
| 2,542,218 | Taelstede | Feb. 20, | 1951 |
| 2,545,562 | Thiel | Mar. 20, | 1951 |
| 2,688,563 | Kieffer | Sept. 7, | 1954 |
| 2,718,151 | L'Abee-Lund | Sept. 20, | 1955 |
| 2,786,792 | Mikiska | Mar. 26, | 1957 |
| 2,947,325 | McFarland | Aug. 2, | 1960 |